United States Patent [19]
Wallace

[11] Patent Number: 5,666,473
[45] Date of Patent: Sep. 9, 1997

[54] TACTILE COMPUTER AIDED SCULPTING DEVICE

[75] Inventor: Michael G. Wallace, Albuquerque, N. Mex.

[73] Assignee: Science & Technology Corporation & Unm, Albuquerque, N. Mex.

[21] Appl. No.: 957,874

[22] Filed: Oct. 8, 1992

[51] Int. Cl.⁶ .................................................. G06F 3/14
[52] U.S. Cl. ........................................ 345/420; 345/179
[58] Field of Search ........................... 395/119–121, 129, 395/124, 133, 88, 137, 93, 140, 141, 162, 501, 523; 345/126, 6, 158, 179, 156; 382/46; 341/27, 34; 901/33, 46

[56] References Cited

U.S. PATENT DOCUMENTS

| | | | |
|---|---|---|---|
| 4,885,702 | 12/1989 | Ohba | 395/119 |
| 5,055,838 | 10/1991 | Wise et al. | 340/870.37 |
| 5,148,372 | 9/1992 | Maiocco et al. | 364/474.24 |
| 5,237,647 | 8/1993 | Roberts et al. | 395/119 |

OTHER PUBLICATIONS

Coquillart, S., "Extended Free–Form–Deformation: A Sculpturing Tool for 3D Geometric Modeling, *Computer Graphics*", vol. 24, No. 4, pp. 187–195 (Aug. 1990).

Foley, J., et al. Editors, "Computer Graphics Principles and Practice," Textbook, Addison–Wesley Publishing Company (1990).

Galyen, T., et al., "Sculpting: An Interactive Volumetric Modeling Technique," *Computer Graphics*, vol. 25, No. 4, pp. 267–274 (1991).

Pentland, A., et al.,"The Thing World Modeling System: Virtual Sculputing by Modal Forces," *Vision and Modeling Group*, Cambridge, MA.

Sederberg, T., et al., "Free–Form Deformation of Solid Geometric Models," *Siggraph '86*, vol. 20, No. 4, pp. 151–160, (Aug. 1986).

Williams, L., "3D Paint," *Association for Computing Machinery*, pp. 225–233 (1990).

*Primary Examiner*—Kee M. Tung
*Attorney, Agent, or Firm*—Jeffrey D. Myers; Deborah A. Peacock; Donovan F. Duggan

[57] ABSTRACT

A device for the simultaneous modeling and rendering of three-dimensional objects on a computer display through a tactile user input. The tactile user input consists in part of a closed solid surface. The preferred form of this surface is a ball. This ball is enveloped by a plurality of sensors, all of which can feed electronic signals to a central processing unit equipped for graphical display. The software component of the device contains data structures representing various primitive and other generic solid objects, such as a sphere, a cube, a cylinder, and coarse generic anatomical solids (human head, hand, nose, arm, foot, torso, leg, body, horse head, dog head, etc.). Each primitive or generic solid object has defining nodes which are geometrically correlated to the relative positions of the sensors on the tactile ball. The spatial positions of the nodes are altered in response to tactile stimulus applied to corresponding sensors on the tactile ball. Furthermore, as the tactile ball is rotated about its own center of gravity by the user, the nodal network is rotated in a corresponding manner, allowing the user to see, and therefore more easily manipulate, hidden surfaces. This device promotes the artistic creation of computer displayed solid objects that are not easily approximated by conventional approaches, such as mathematically defined surfaces.

16 Claims, 5 Drawing Sheets

ROTATE ABOUT "z" BY θ
i.e., ROT$_z$(θ)
$$\begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

ROTATE ABOUT "x" BY θ
i.e., ROT$_x$(θ)
$$\begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}$$

ROTATE ABOUT "y" BY θ
i.e., ROT$_y$(θ)
$$\begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix}$$

FIG-3b

PRIOR ART

TACTILE COMPUTER AIDED SCULPTING DEVICE

BACKGROUND OF THE INVENTION

1. Field of the Invention

The present invention relates to a process that provides an intuitive and user-friendly means for the modeling and rendering of computer-displayed free-form solid objects. A host of approaches have been taken over the past several decades in the depiction of three-dimensional solids on two-dimensional computer screens. Commonly, mathematically defined solid primitives are manipulated and/or combined to create the desired illusion. For example, a sphere could be placed atop a construction of cylinders corresponding to a torso, arms, and legs to approximate a crude human shape. For another example, a tetrahedron and two spheres could be attached to the surface of a larger ovoid ball to represent a crude nose, two eyes, and a head. These examples highlight the fact that the spatial characteristics of most anatomical and other natural objects do not have simple mathematical analogues. Unfortunately, computer visualization systems are largely dependant upon such analogues for the representation of any object or surface. This has precluded the professional sculptor (and in many cases, the professional designer), who is generally not highly skilled in the arcana of computer visualization mechanics, from contributing his artistic talents to the rendering of free-form solid computer images. Conversely, mathematically adept computer specialists, who are not generally skilled in the visual fine arts, have had the burden of providing such images.

2. Description of the Prior Art

Various tools have been developed in an attempt to circumvent this shortcoming. Some tools begin with solid primitives and then allow free-form manipulation via onscreen menu commands sometimes along with the additional use of a digitizing puck, light pen, mouse, or other related input device. Some examples of such devices are described in L. Williams, "3D Paint," Computer Graphics, 24 (2):225–233, March, 1990; Sederberg, T. W. and S. R. Parry, "Free-Form Deformation of Solid Geometric Models," Computer Graphics, 20(4):151–160, August, 1986; S. Coquillart, "Extended Free-Form Deformation: A sculpting tool for 3D Geometric Modeling," Computer Graphics, 24(4):187–196, August 1990; and Pentland, A., et. al, "The ThingWorld Modeling System: Virtual Sculpting by Modal Forces," Computer Graphics, 24(2):143–146, March 1990.

Other approaches involve the use of a three-dimensional input device, corresponding to a "virtual" tool, which can remove, add, or smooth "material" from an initial "block" of "clay". This development is described in Galyean, T. A. and J. F. Hughes, "Sculpting: An Interactive Volumetric Modeling Technique," Computer Graphics, 25(4):267–274, July, 1991. Although this device is perhaps the most intuitively appealing of the current approaches, it presently lacks true tactile feedback. Furthermore, due to its adoption of a voxel-based, as opposed to a polygon-based system, this device is computationally demanding. So much so, in fact, that it requires powerful workstations presently beyond the affordability of most artisans.

No matter what the approach, in order to render a solid object, a computer graphic display system must at a minimum have geometric information specific to the object. A secondary requirement is information on surface textures, hidden surfaces, light sources, perspective, shading, and other attributes. All of these features can augment the appearance of three-dimensionality of an object, but they all necessarily rely on a priori knowledge of the location of the object, with reference to a world coordinate system, and the specific volume in space that it occupies.

SUMMARY OF THE INVENTION

The purpose of the present invention is to provide an improved, cost-effective, and intuitively appealing system for free-form modeling and rendering of solid objects. This is achieved through an input device having a physical shape that has some correspondance morphologically and topologically to many commonly encountered physical solid objects, or parts of objects. The computer image of a solid object can be modified through manipulation of this input device. The types of manipulation that can be applied through the device are rotation and deformation. These manipulations are effected through application to the input device of twisting and tactile stimulus, respectively.

Standard matrix operations, ubiquitous in the computer graphics field, are utilized to effect the transformations of translation, rotation, shearing, or scaling, or any combination of these. Although the invention does not provide any enhancements to the transformations of translation or scaling, it does provide an intuitive means to rotate and deform a computer-rendered solid object.

The invention consists of two basic entities, a data component and a hardware component. The data component consists of a variety of selectable data structures, all with their corresponding individual nodal networks. Examples of data structures include a sphere, a cube, a cylinder, or a tetrahedron. Other examples include an egg-shaped ovoid, a generic human head, a generic human nose, or a generic human arm.

The hardware component of the invention consists of an input device. This input device is a graspable, somewhat rigid, closed surface in contact with one to three rotational sensors. As with a common computer "mouse", the sensors employ potentiometers or other technologies to monitor the rotation of the closed surface with respect to up to three orthogonal axes, all of which intersect the centroid of the closed surface. Examples of forms the closed surface could take are; a ball, a box, an egg-shaped ovoid, or a generic human head. The closed surface is covered with a network of sensors. The sensor-covered surface can be enveloped by a flexible, elastic sheath.

The data component of the invention is modified in response to user-manipulation of the hardware component of the invention. Let it be assumed that the user rotates the hardware component about one or more of its axes. Corresponding rotational transformations are then applied to the data portion. Let it be assumed that the user applies tactile pressure to a region on the hardware portion of the device. Corresponding deformations are then applied to the data component. The user can continue to "knead" the surface of the hardware component, working on all sides, and viewing the progress through a computerized rendition of the data portion (and seeing whichever face of the data he/she wishes through the rotational capabilities) until he/she has achieved the desired form effect.

BRIEF DESCRIPTION OF THE DRAWINGS

FIG. 3b specifies matrix transformations for rotations about x, y, or z axes.

DESCRIPTION OF THE PREFERRED EMBODIMENTS

Figure 1:
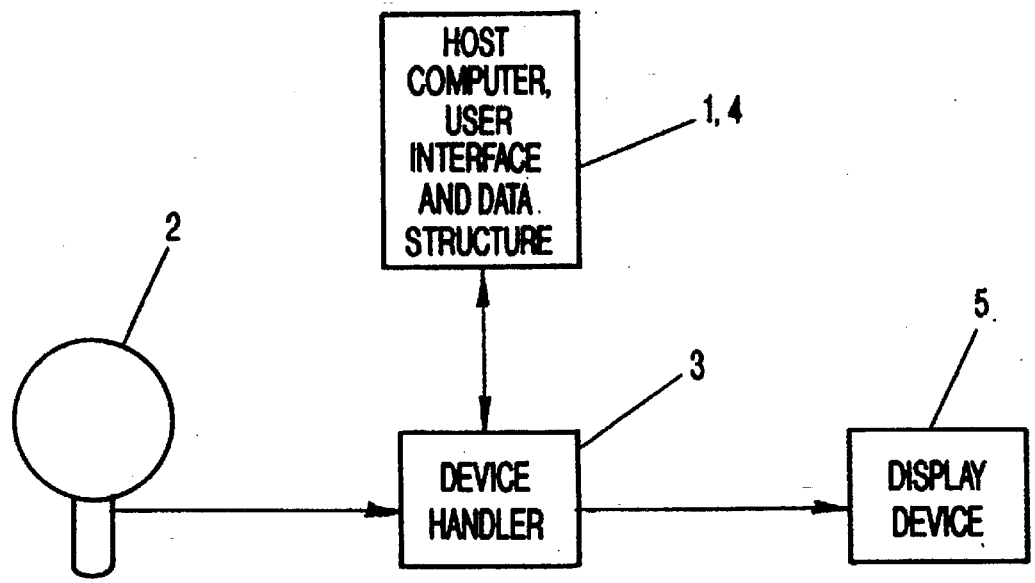
FIG. 1 illustrates a preferred broad block diagram of the three-dimensional object definition, modification, and display system incorporating the present invention.

The invention consists of two basic entities; a data component 1 and a hardware component 2, which are linked through a device handler 3 and a computer 4 which, in addition to calculational and user interface operations, provides feedback of hardware inputs and resulting data modifications through a display device 5, as shown in FIG. 1. The data component is embedded in the computer via either software or hardware, and contains information about three-dimensional objects. Specific manipulations of the hardware device cause specific changes in selected data sets, leading to changes in the shape of the object. The object's shape, and its resulting changes are viewed through the computer display device.

Generally, a data structure consists of a numerical array, containing a series of spatial point (or 'node') identifiers, their respective coordinates (whether cartesian, cylindrical, spherical, or some other system), and their connectivity with other points of the same data structure. Given this basic description, the data structure could be said to define what is commonly termed a "wire mesh" object. Other attributes could also be contained within this array, including opacities, textures and colors for surface portions described by this wire mesh.

The closer the starting shape is to the desired final shape, the more efficient the modeling process is. Therefore, the data component consists of a variety of selectable data structures, all with their corresponding individual nodal networks. Examples of data structures include a sphere, a cube, a cylinder, or a tetrahedron. Other examples include an egg-shaped ovoid, a generic human head, a generic human nose, or a generic human arm.

Figure 2:
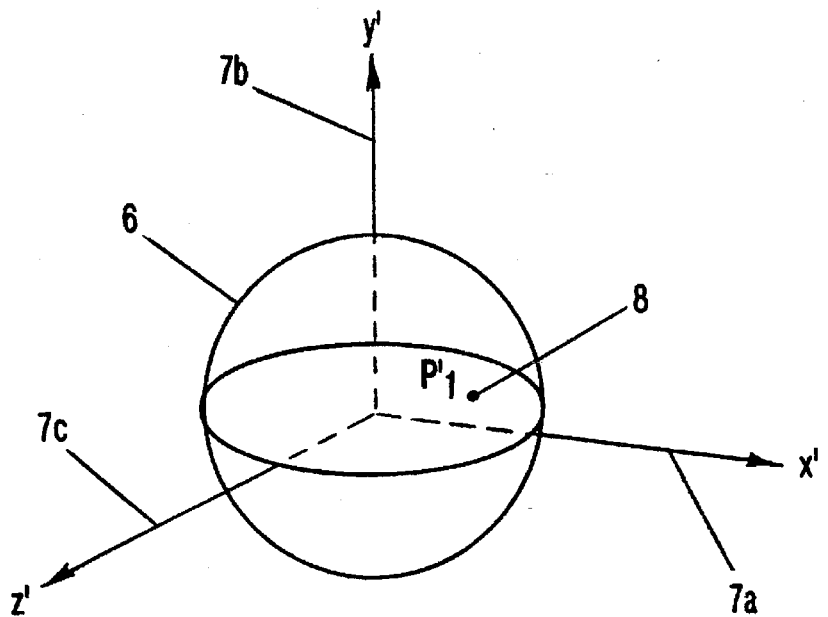
FIGS. 2, 3, 3b, and 4-7 are conceptions of the preferred hardware and data structure portions of the inventions, including depictions of example hardware-data structure interactions.

FIG. 2. is a depiction of a data structure as a sphere 6. The centroid of this sphere is represented as the origin of a cartesian coordinate system, having the associated three orthogonal axes; x', y', and z' 7a, 7b, 7c. A single point from the nodal mesh, is labeled on the drawing as P' 1 8. Node P'1 has the initial coordinates $x'_1, y'_1, z'_1$.

The hardware component of the invention consists of an input device as shown in FIG. 3. This input device is a graspable, somewhat rigid, closed surface 9 in contact with one to three rotational sensors 10. As with a common computer "mouse", the sensors employ potentiometers or other technologies to monitor the rotation of the closed surface with respect to up to three orthogonal axes, all of which intersect the centroid of the closed surface 11a, 11b, 11c. Examples of forms the closed surface could take are; a ball, a box, an egg-shaped ovoid, or a generic human head. The closed surface is covered with a plurality of sensors. A single sensor from this network is depicted as point P1 12. The sensor-covered surface can be enveloped by (or embedded in) a flexible, elastic sheath. Other, alternative technologies could replace the plurality of sensors, the basic idea remaining that the input device sends specific signals to the computer in response to tactile stimuli at specific locations on its surface. A toggle switch 13 can be present on the input device, or alternately, the toggling for which it is designed can be accomodated within the user interface.

The data component of the invention is modified in response to user-manipulation of the hardware component of the invention. Let it be assumed that the user rotates the hardware component about one or more of its axes. Corresponding rotational transformations are then applied to the data component. Let it be assumed that the user applies tactile pressure to a region on the hardware component of the device.

Customary rotational matrix transformations can be coded to handle any possible sequence of rotations about any axis. FIG. 3b. outlines the matrix transformations for rotations about the x, y, or z axes. A concise treatment of rotational transformations in three dimensions can be found in Foley et al., "Computer Graphics: Principles and Practice", 1990, Addison-Wesley, Reading, Mass.

Figure 4:
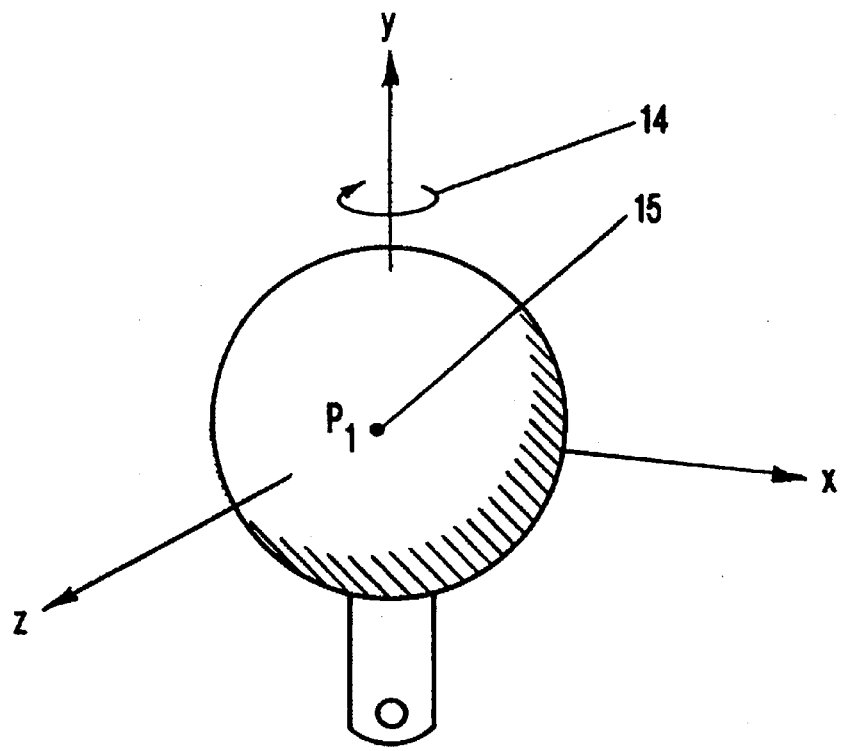
Figure 5:
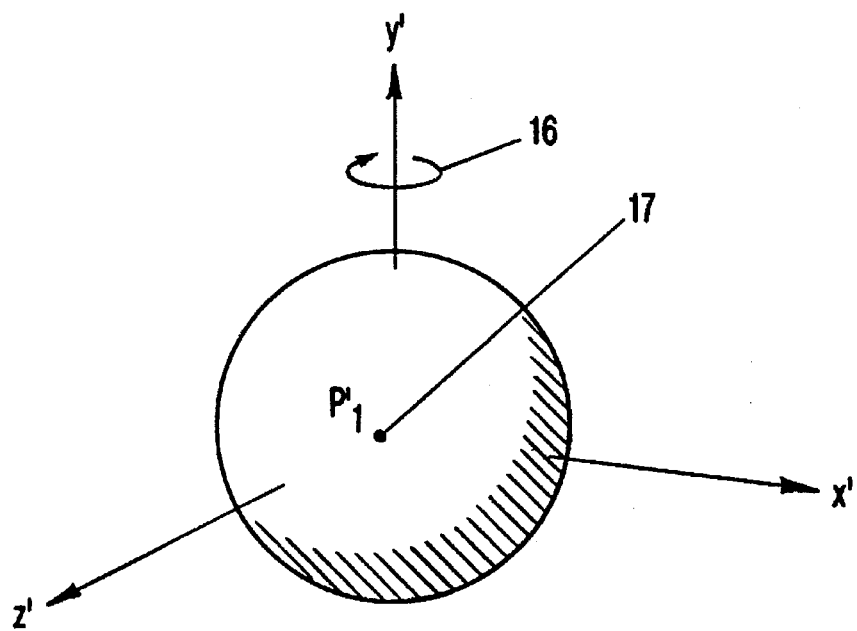

When the user grasps the input device and twists it about one of the device's internal axes, the appropriate directional sensors send rotational information to the CPU, where rotational operations are applied to the selected data structure. The new orientation of the data structure is depicted on the display device and reflects the new orientation of the input device. FIG. 4. depicts the rotation of the input device N degrees about its y axis 14. The sensor P1 has moved accordingly 15. FIG. 5. shows the sphere data structure which has now also been rotated 16 in response to signals sent to the computer due to rotation of the input device. Assuming that the shortest distance from $P'_1$ to the y' axis is R, and given the initial position of $P'_1$ at $x'_1, y'_1, z'_1$, and given a rotation of the sphere of N degrees about its y' axis, the new position of $P'_1$ is at $x'_2, y'_2, z'_2$ 17, where:

$$x'_2 = x'_1 \cdot \cos(N) + z'_1 \cdot \sin(N)$$

$$y'_2 = y'_1$$

and $$z'_2 = -x'_1 \cdot \sin(N) + z'_1 \cdot \cos(N).$$

Figure 3A:
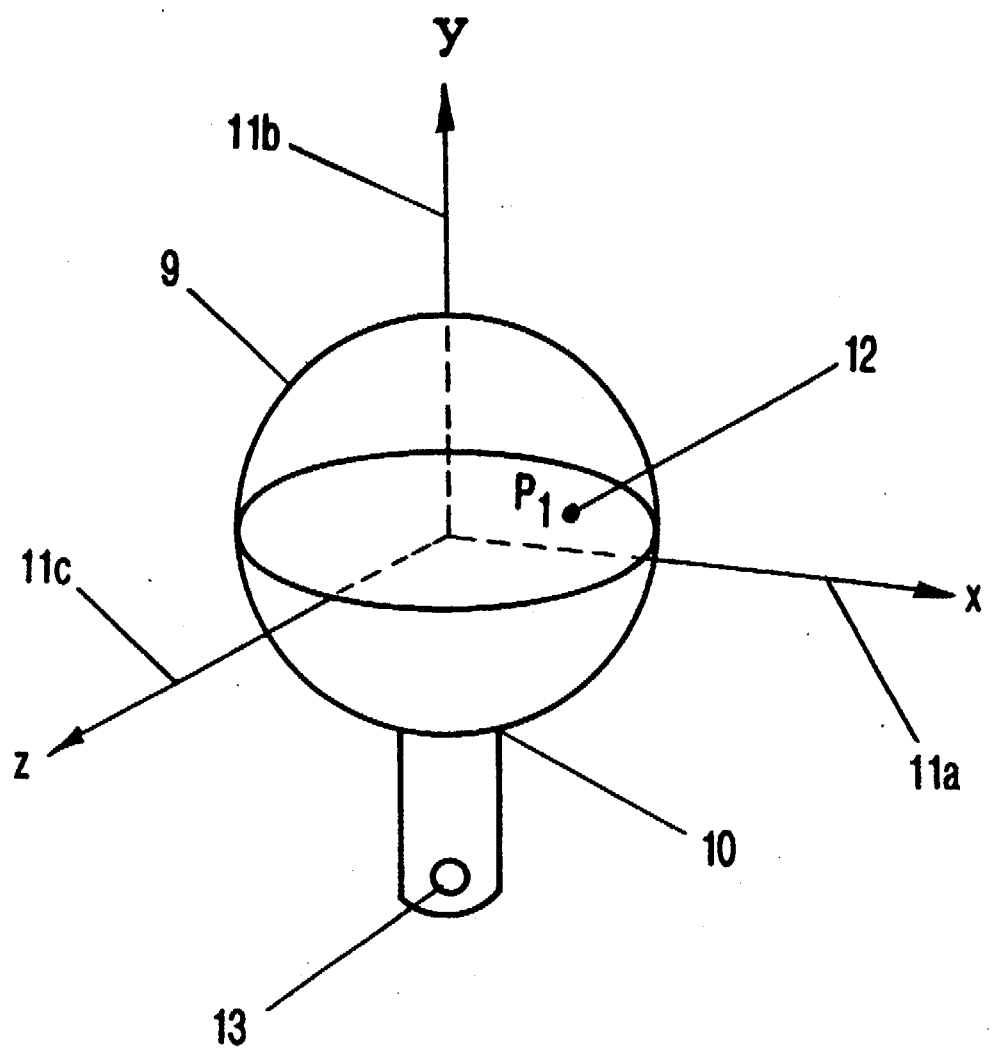

Through the user interface, a dataset may be selected. Once selected, the image of the data structure appears on the computer display device. The data structure is oriented with respect to a world coordinate system in a manner that corresponds to the current orientation of the input device, as shown in FIGS. 2 and 3a. In those figures, point P'1 of the nodal network has a position which corresponds to the position of sensor P1 on the input device.

Rotations

When the user grasps the input device and twists it about one of the device's internal axes, the appropriate directional sensors send rotational information to the cpu, where rotational operations are applied to the selected data structure. The new orientation of the data structure is depicted on the display device and reflects the new orientation of the input device. FIG. 4. depicts the rotation of the input device N degrees about its y axis 14. The sensor P1 has moved accordingly 15. FIG. 5. shows the sphere data structure which has now also been rotated 16 in response to signals sent to the computer due to rotation of the input device. Assuming that the shortest distance from P'1 to the y axis is R, and given the initial position of P'1 at $x'_1, y'_1, z'_1$, and given a rotation of the sphere of N degrees about its y axis, the new position of P'1 is at $x'_2, y'_2, z'_2$ 17, where:

$$x'_2 = R \cdot \cos(N)$$

$$y'_2 = y'_1$$

and $z'_2 = R \cdot \sin(N)$

More generally, customary rotational matrix transformations can be coded in to handle any possible sequence of rotations about any axis. A concise treatment of rotational transformations in three dimensions can be found in the text, "Computer Graphics Principles and Practice", authors: Foley, van Dam, Feiner, and Hughes, 1990, Addison-Wesley Publishing Company, Inc., Reading, Mass.

Deformations

When the user applies direct tactile pressure to the input device, one or more sensors on the device may be pressed down. When this occurs, the associated binary signals are sent to the cpu, where calculations are performed that determine the new positions of the associated nodes of the data structure. In addition to the actual pressing of the sensors, several other factors affect the ultimate positions of the associated nodes.

Each node of the data structure has at least one degree of freedom. In a simple, but not completely general sense, this degree of freedom consists of the normal projection of the node either "into" the interior of the closed surface defined by the data structure or "out" from the exterior of the surface. Calculations of normal vectors to surfaces is routine in the computer graphics, as well as many other fields. Another version of this description would consist of a projection of a ray from the centroid of the data structure through the node. The node can move in either direction along the ray, both towards or away from the centroid. In this implementation, due to reasons discussed later, the projection would not necessarily be normal to the surface.

Figure 6:
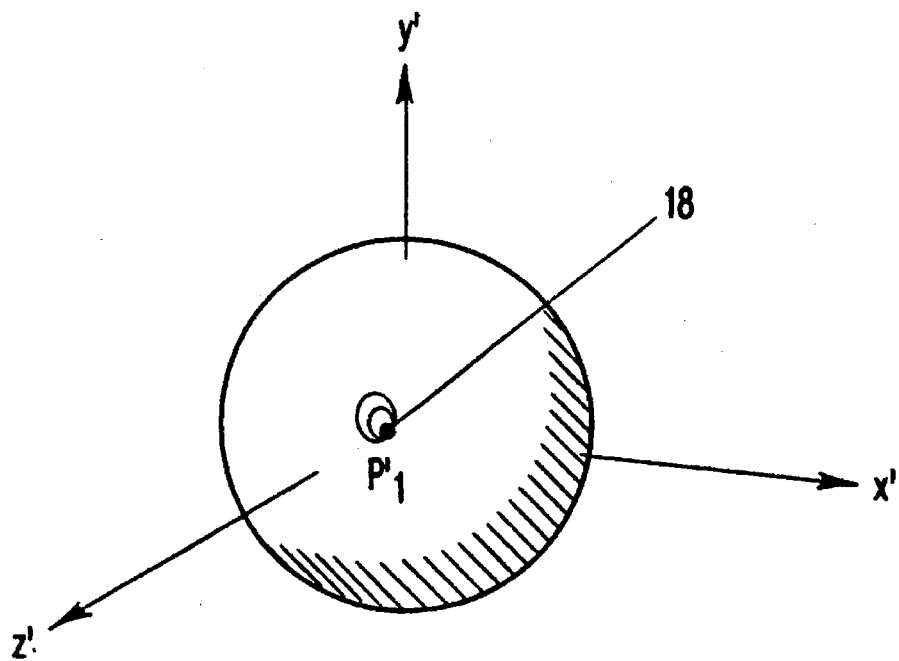

Through either a user interface or hardware, a toggle 13 selects whether the primary direction of a node in response to tactile input is "into" or "out" of the data structure. FIG. 6 shows the new position of the point P1', at $x_3',y_3',z_3'$ 18, following user-applied pressure to the sensor that represents point P1. The toggle has been set to "into", thereby creating an indentation into the sphere. Had the toggle been set to "out", the projection would have been out of the sphere, thereby creating a bump instead of an indentation.

Programming of the device is such that the length of time the sensor is pressed dictates the magnitude of projection of the node. For this example that means that the longer the sensor that represents P1 is pressed, the deeper point P'1 will project into the sphere. The speed of projection, although subject at the high end to limitations associated with the particular computer platform being used, is adjustable by the user, through the user interface or a hardware mechanism.

There are occasions where user input to the device could result in the generation of complicated surfaces which are no longer truly "closed". For example, if a node was projected interiorly through the centroid and beyond, until it breached the opposite site of the structure, then the data structure would resemble a Klien Bottle. If a group of nodes were merely projected interiorly through the centroid, they would first converge, then diverge, thereby inverting their relative positions. An option is therefore provided in the user interface which can preclude such complicated outcomes if desired, for example, by not allowing any node to interiorly project beyond the centroid of the data structure.

The invention could consist of these features at a minimum and still be an effective sculpting tool. However, a means for effecting tangential motion (also known as shearing) of the nodes is desirable in many cases. Through a combination of tangential and normal motion, every node then has three degrees of freedom. In such cases as these, a user could "pinch" the surface of the input device, or apply other shearing stresses to obtain more sophisticated effects. Such shearing effects are capable of creating boundaries in which further projections of nodes towards or away from centroids would no longer be normal to the object's surface, as inferred earlier.

There are many routine methodologies by which the tangential direction of tactile pressure could be determined. The common computer "joystick" is one example. In the joystick, a limited number of directions are interpretable as selected contacts are closed, due to the position of the joystick, thereby completing a specific circuit. Other available methods allow the determination of virtually any tangential direction in which tactile pressure is applied. One example is the use of strain gauges. A minimal array of strain gauges would surround each sensor stem. Interpolation of the array of measured strains in response to tangential pressure applied to the sensor can then be performed to determine the tangential vector for the affected node.

Figure 7:
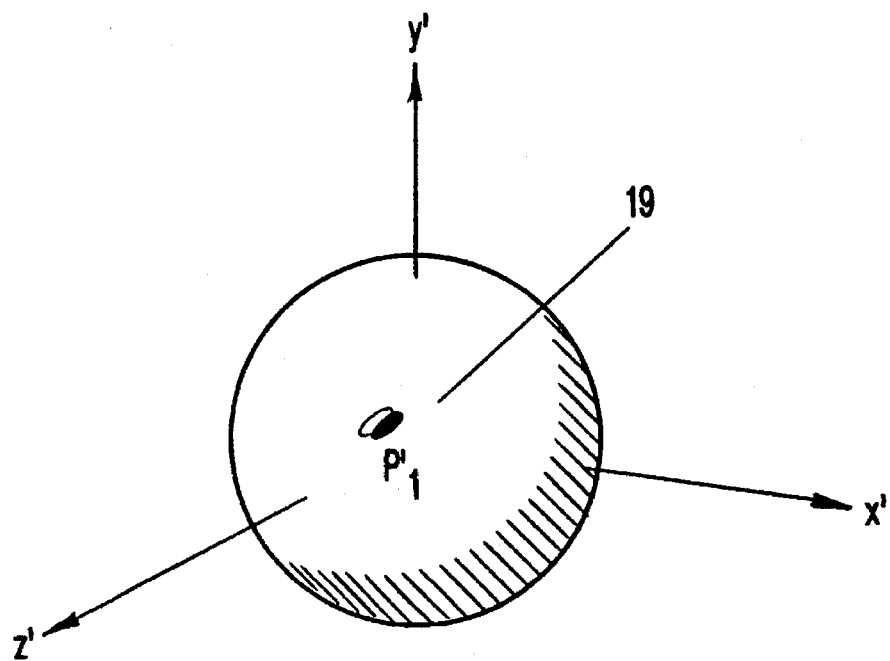

A tangential motion (shearing) option is therefore provided for the device, with an ability to invoke it through the user interface. FIG. 7 shows the new position of the point P1', at $x_4',y_4',z_4'$ 19, following user-applied shear force to the sensor that represents point P1, given other previously defined parameter selections, with shearing option on.

If a voxel approach were to be utilized, rather than a "wireframe" approach, then the fundamental principals remain the same. Mainly, that the shape that a data set comprises (in this case represented by a scalar field) is rotated in response to twisting of the input device, and otherwise deformed in response to tactile pressure applied to the input device. In this case, directional "tunnelling" or "mound building" would be effected in response to tactile pressures. Such cases would not have the potential Klein bottle effects associated with a wireframe case.

As with all user manipulations associated with the invention, the processing power and speed of the cpu, the communication flux of the interface between the cpu and the input device, the efficiency of the software, and the memory configuration of the system will all determine whether or not changes in the data structure are reflected on the display device in real time. Real time feedback of changes is a desirable attribute of the total system. In addition, the higher the density of sensors on the input device, the greater the resolution/detail possible in the object image. However, larger and larger numbers of sensors ultimately dictate greater and greater cpu and computer memory performance. Furthermore, there are alternative means to achieve more complex and detailed structures, such as combining and/or attaching individually sculpted objects.

Since the basis for the display of the three-dimensional object is a data structure, which is itself an array of numbers, the images created could be further augmented and modified through additional user interface options or other computer graphics devices and/or programs. For example, as just suggested in the previous paragraph, two data structures could be combined, or attached to each other, in any manner, using a host of available off-the-shelf graphics technologies. Other state-of-the-art computer tools could direct lathing and/or other machines to fabricate an actual solid model of the dataset. These examples serve to illustrate some applications of the Tactile Computer Aided Sculpting Device.

The above discussion has been intended to be illustrative and not limiting. For example, tactile feedback devices such as those used in virtual reality systems could be easily incorporated into the invention, further augmenting its appeal in certain cases.

Having just described my invention, I claim:

1. An apparatus for modeling and rendering three-dimensional objects, said apparatus comprising:

tactile input means comprising an essentially closed convex exterior surface comprising a plurality of tactile sensors attached thereto; and means for communicating signals from said tactile sensors to a computer equipped with three-dimensional graphic display means.

2. The apparatus of claim 1 wherein said essentially closed convex exterior surface is spheroidal.

3. The apparatus of claim 1 wherein said essentially closed convex exterior surface resembles a human head.

4. The apparatus of claim 1 additionally comprising three-dimensional data structure means for representing an object within the three-dimensional graphic display means.

5. The apparatus of claim 4 wherein said three-dimensional data structure initially comprises a representation of a spheroidal solid object.

6. The apparatus of claim 4 wherein said three-dimensional data structure initially comprises a representation of a human head.

7. The apparatus of claim 4 wherein said three-dimensional data structure means for representing an object within the three-dimensional graphic display means comprises nodes which define a surface representation of the object.

8. The apparatus of claim 4 wherein said three-dimensional data structure means for representing an object within the three-dimensional graphic display means comprises voxels which define a volume representation of the object.

9. The apparatus of claim 4 additionally comprising means for manipulating said three-dimensional data structure means in response to pressure stimuli on said tactile sensors.

10. The apparatus of claim 9 additionally comprising means for controlling a direction of manipulation of said three-dimensional data structure in response to pressure stimuli on tactile sensors.

11. The apparatus of claim 9 additionally comprising means for controlling a rate of manipulation of said three-dimensional data structure in response to pressure stimuli on tactile sensors.

12. The apparatus of claim 4 additionally comprising means for manipulating said three-dimensional data structure means in response to shear stimuli on said tactile sensors.

13. The apparatus of claim 12 additionally comprising means for controlling a rate of manipulation of said three-dimensional data structure in response to shear stimuli on tactile sensors.

14. The apparatus of claim 12 additionally comprising means for controlling a direction of manipulation of said three-dimensional data structure in response to shear stimuli on tactile sensors.

15. The apparatus of claim 4 wherein said tactile input means comprises means for rotating said tactile input means and means for detecting rotation of said tactile input means.

16. The apparatus of claim 15 additionally comprising means for rotating said three-dimensional data structure means in response to rotation stimuli on said means for detecting rotation.

* * * * *